United States Patent [19]

Nedstedt

[11] Patent Number: 5,498,225
[45] Date of Patent: Mar. 12, 1996

[54] OPENING DEVICE FOR A PACKAGING CONTAINER AND METHOD OF MANUFACTURING THE SAME

[75] Inventor: Ulf Nedstedt, Eslöv, Sweden

[73] Assignee: Tetra Laval Holdings & Finance S.A., Pully, Switzerland

[21] Appl. No.: 851,799

[22] Filed: Mar. 16, 1992

[30] Foreign Application Priority Data

Mar. 27, 1991 [SE] Sweden .................................. 9100921

[51] Int. Cl.$^6$ ........................................................ B31B 1/84
[52] U.S. Cl. .............................. 493/87; 493/85; 493/339; 229/125.14
[58] Field of Search .................................. 493/87, 84, 85, 493/211, 339, 264; 229/125.14

[56] References Cited

U.S. PATENT DOCUMENTS

| | | | |
|---|---|---|---|
| 1,450,260 | 4/1923 | Newman . | |
| 2,064,739 | 12/1936 | Fink . | |
| 2,695,111 | 11/1954 | Voss . | |
| 2,948,440 | 6/1957 | Baravecchia | 222/545 |
| 3,339,812 | 9/1967 | Meissner . | |
| 3,484,518 | 12/1969 | Ignell | 264/519 |
| 4,007,848 | 2/1976 | Snyder | 215/31 |
| 4,007,851 | 2/1976 | Walker | 215/260 |
| 4,572,422 | 2/1986 | Heuberger et al. . | |
| 4,604,850 | 8/1986 | Reil . | |
| 4,726,482 | 2/1988 | Barriac | 215/252 |
| 4,830,273 | 5/1989 | Kalberer et al. | 229/123.1 |
| 4,909,434 | 3/1990 | Jones et al. . | |
| 4,934,548 | 6/1990 | Hsu | 215/307 |
| 4,964,562 | 10/1990 | Gordon . | |
| 4,971,219 | 11/1990 | Dombeck et al. | 220/303 |
| 5,027,979 | 7/1991 | Kawajiri et al. . | |
| 5,088,643 | 2/1992 | Frazier et al. | 229/125.15 |

FOREIGN PATENT DOCUMENTS

| | | |
|---|---|---|
| 0342729 | 11/1989 | European Pat. Off. . |
| 0405072 | 1/1991 | European Pat. Off. . |
| 2229241 | 8/1976 | France . |
| 2447876 | 8/1980 | France . |
| 3336269 | 4/1985 | Germany . |
| 3832412 | 4/1989 | Germany . |
| 3830224 | 3/1990 | Germany . |
| 4015119 | 1/1991 | Germany . |
| 124591 | 5/1972 | Norway . |

*Primary Examiner*—Bruce M. Kisliuk
*Assistant Examiner*—Eileen P. Morgan
*Attorney, Agent, or Firm*—Burns, Doane, Swecker & Mathis

[57] ABSTRACT

Opening device for a packaging container with an unbroken, liquid-tight pouring spout (31, 33) and a closure part (3) is disclosed. A method of manufacturing the opening device entails forming the pouring spout (21, 33) with the closure part (3) as a mold, with a heated, thermoplastic material layer being forced into the closure part through a pressure difference.

21 Claims, 3 Drawing Sheets

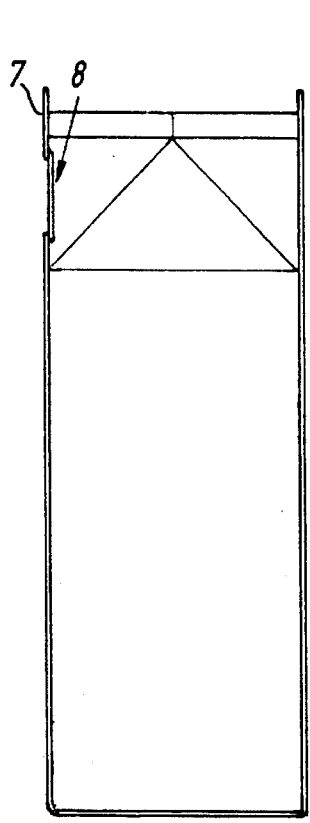
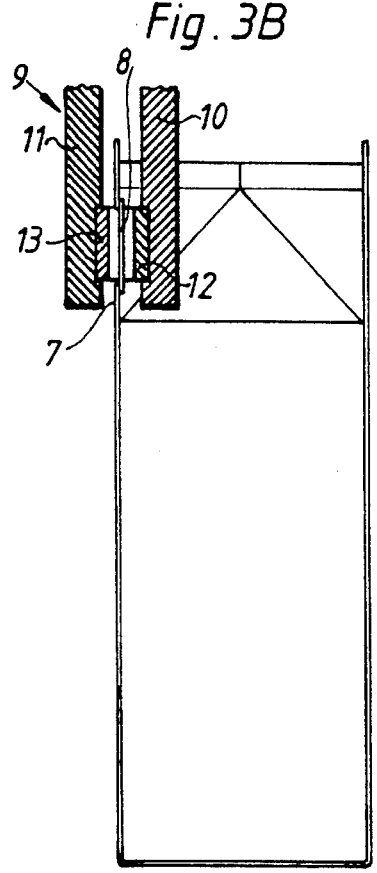
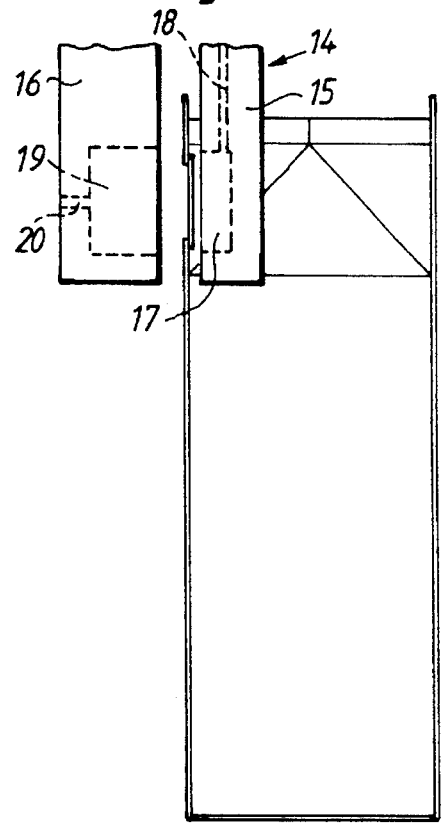
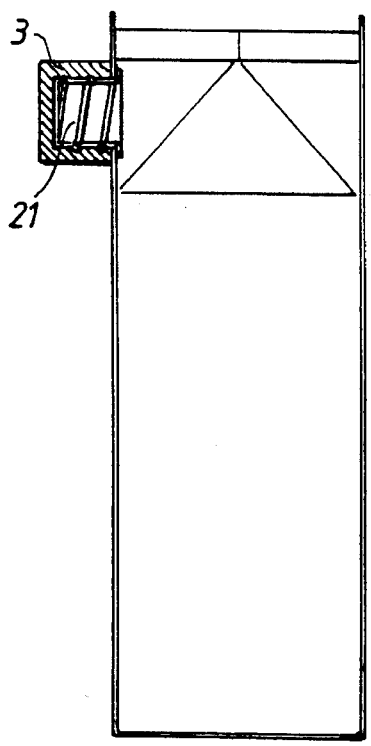
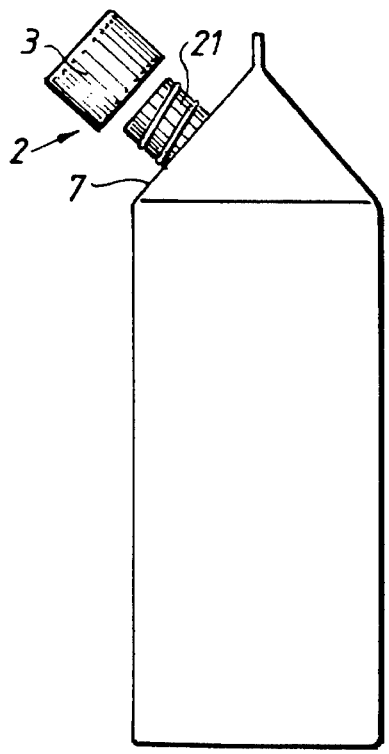

OPENING DEVICE FOR A PACKAGING CONTAINER AND METHOD OF MANUFACTURING THE SAME

The present invention concerns an opening device for a packaging container, and this opening device includes a closure part and a pouring spout. The invention also concerns a method of manufacturing an opening device for a packaging container.

Packaging containers of disposable type are now used to a great extent for packaging consumer goods of different types, e.g. drinks such as milk and juice. For reasons of cost the packaging containers are usually made of relatively thin packaging laminates which contain a strength-giving layer of a fibrous material, e.g. paper, which is laminated on both sides with liquid-tight layers of thermoplastic, e.g. polythene. Such packaging laminates are flexible and can be cut and bent to the desired shape. The external coating of thermoplastic material also makes it possible to heat-seal the laminate to itself in a simple manner, so that a packaging container of the desired shape can be obtained.

It is naturally desirable that the finished packaging container should include an opening device which makes it possible to open the packaging container in a simple manner when the contents are to be consumed. The opening device must further make it possible to extract the packaging container's contents in liquid form in a well collected stream without the risk of spillage or dripping. These objectives have, however, shown themselves to be difficult to combine in a simple manner with packaging containers made of flexible paper and plastic laminate, since the packaging laminate can only with difficulty be pulled up and shaped to a pouring spout or other form which gives the desired stable flow of contents. The shaping of an opening device directly in the packaging laminate furthermore makes it difficult to provide a liquid-tight reclosure of the packaging container. In order to avoid the abovementioned difficulties a known method is to manufacture a packaging container whose body mainly consists of the abovementioned packaging laminate of paper and plastic, but whose top part is manufactured from a completely plastic material through injection moulding of an upper end gable in direct contact with the laminate. The end gable can by this means be provided with an opening device of the desired form, which in addition can have some form of reclosure possibility. This type of packaging container is shown e.g. in the German patent DE 32 17 156. Packaging containers of this kind have proved very useful from the consumer's point of view and are simple to open and reclose. The injection moulding of the packaging container's upper end gable, however, entails that the packaging machine must be provided with further costly equipment at the same time as the machine's capacity is limited by the fact that the injection moulded upper part, owing to its relatively great thickness of material requires a certain cooling and stabilisation time before the packaging container can be transported further through the packaging machine to the subsequent work stations.

An aim of the present invention is to ensure an opening device for a packaging container, with this opening device being simple to manufacture and containing a closure part and a pouring spout, which can be used with packaging containers of known type and thereby avoid the above disadvantages.

A further aim of the present invention is to ensure an opening device of the abovementioned type which gives the packaging container good pouring properties and at the same time ensures a safety closure for the packaging container.

A further aim of the present invention is to ensure an opening device with a properly functioning closure part, which is easy to open and reclose in accordance with established principles well known to the consumer. A further aim of the present invention is to ensure an opening device for packaging containers, with this opening device using a minimum of material and thereby resulting in a very low cost.

The above and other aims have been achieved according to the invention through the fact that a packaging container of the type named in the introduction is given the characteristics that the closure part of the opening device engages form-lockingly with and encloses the end of the pouring spout facing away from the packaging container, with this end consisting of a connected, liquid-tight layer of material which is shaped according to the internal shape of the closure part and arranged so as only to be pierced in connection with the opening of the opening device.

Existing embodiments of the opening device according to the invention have further been given the characteristics which can be seen from the sub-claims 2–9.

An aim of the present invention is further to ensure a method of manufacturing an opening device for a packaging container, with this method not being affected by the abovementioned disadvantages but making it possible quickly and at low cost to apply an opening device suitable for the purpose both with known and new types of packaging container.

A further aim of the present invention is to ensure a method of manufacturing an opening device, with this method at one moment forming a pouring spout and providing the pouring spout with a closure part.

A further aim of the present invention is to ensure a method which makes it possible to provide a packaging container with an opening device without introducing as a result manufacturing or cooling factors which reduce the rate of manufacture.

The above and other aims have been achieved according to the invention through the fact that a method of the type named in the introduction has been given the characteristics that a thermoplastic material layer is exposed to a pressure difference, which brings it to bear against in a formable state and to engage form-lockingly with a prefabricated part of the opening device contained in a forming tool.

Existing embodiments of the method according to the invention have further been given the characteristics which are clear from sub-claims 11–17.

A proposed embodiment of both the method and the device according to the invention will now be described in greater detail with reference to the enclosed schematic drawings which only show the details indispensable for understanding the invention.

Figure 1:
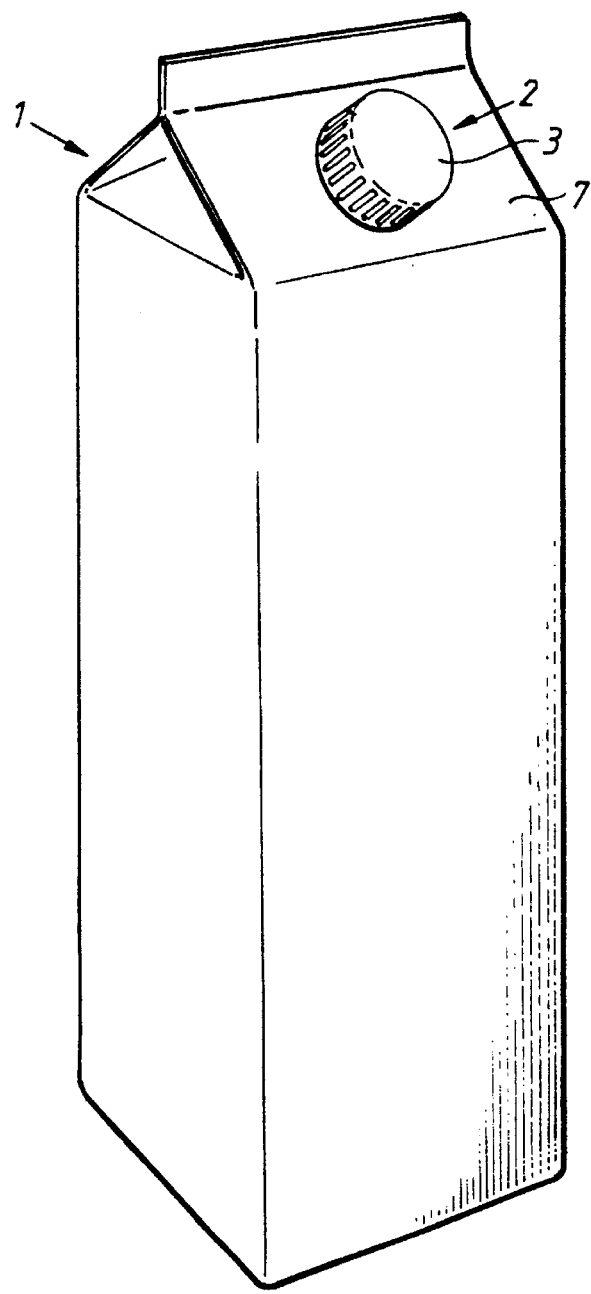
FIG. 1 shows in perspective an opening device according to the invention on a packaging container of known type.

FIG. 3 A–E shows step by step and partially in cross section the application of an opening device according to the invention on a packaging container as per FIG. 1.

Figure 2:
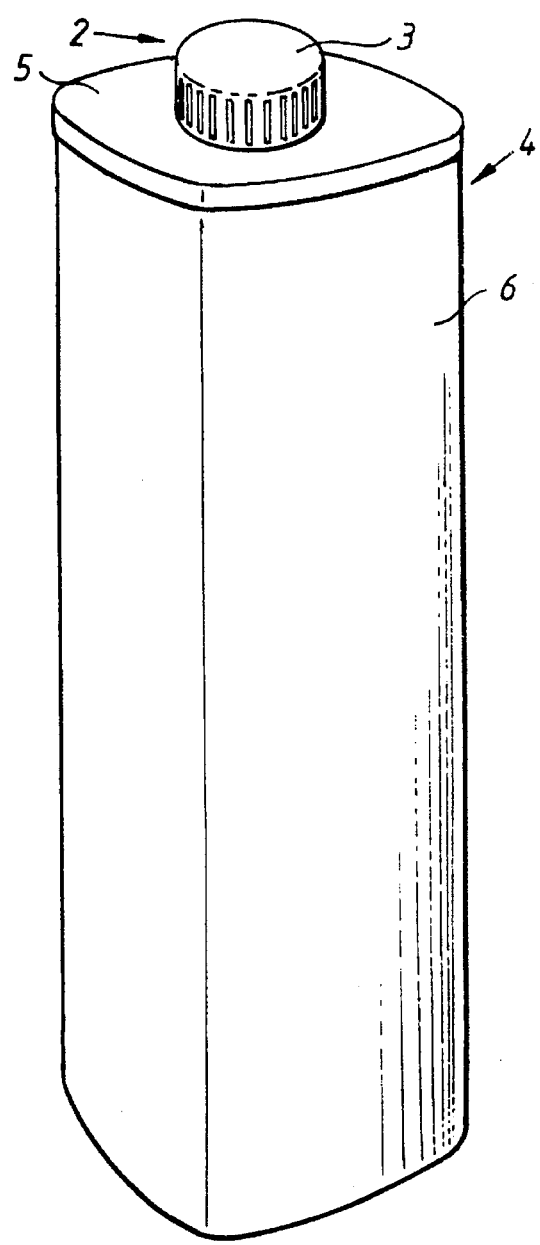
FIG. 2 shows an opening device according to the invention on another type of packaging container.
Figure 4A:
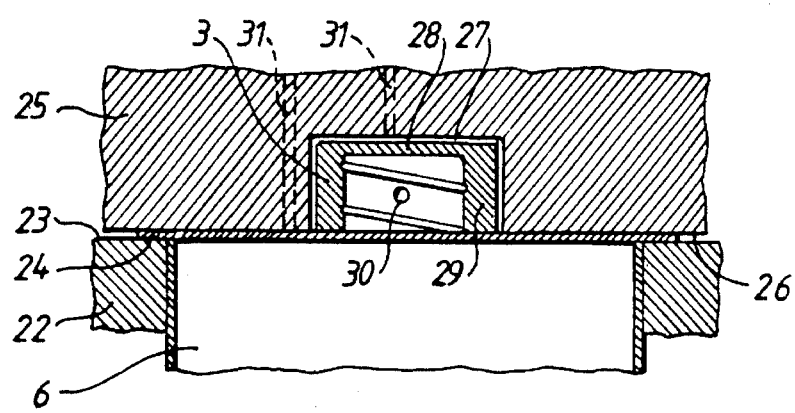
Figure 4B:
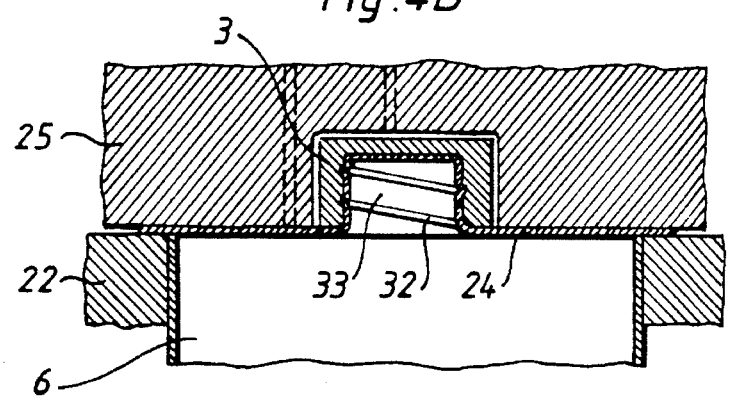
Figure 4C:
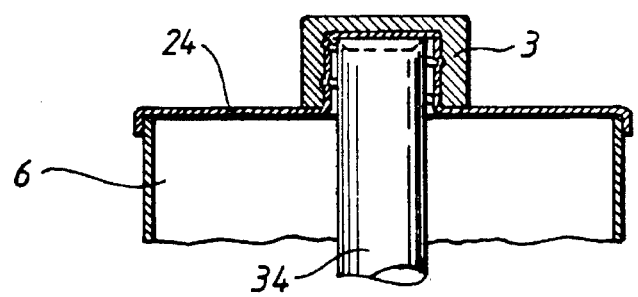
Figure 4D:
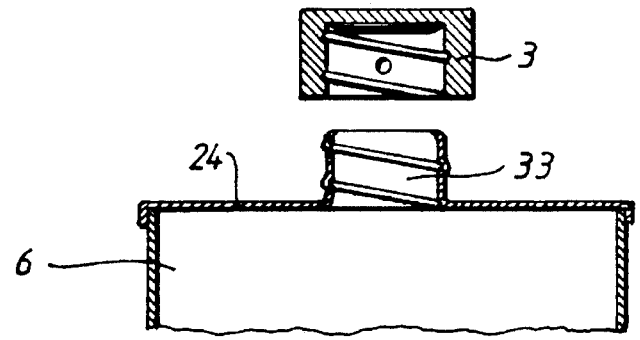

FIG. 4 A–D show step by step and in cross section the shaping of a packaging container according to the invention on a packaging container of the type which is shown in FIG. 2.

The opening device according to the invention and the method of producing the same can be used with a number of types of packaging container of disposable character, e.g. packagings of the type which is manufactured from a laminated material containing layers of paper and thermoplastic. Such packaging containers are generally used for contents in liquid form, e.g. milk or juice, and have hitherto most frequently been provided with an opening device which comprises a break-up or tear-off part of the packaging container, which after opening is given a more or less pronounced pouring spout shape. In order to facilitate the opening, improve the keeping quality and make possible a liquid-tight reclosure, according to the invention an opening device is provided and a method of producing the same which can replace the previously named, known arrangement and methods in conventional packaging containers but can on the other hand also be used to create new types of packaging containers.

FIG. 1 shows a known packaging container 1 of what is known as gable-top type, which is manufactured from a laminated material which contains a bearer layer of paper, which is coated on both sides with thermoplastic material, e.g. polythene. The packaging material has been given the desired form and been folded and heat-sealed for formation of a packaging container which is mainly rectangular in cross section with an upper part of what is known as gable-top type. This known packaging container 1 has been provided with an opening device 2 according to the invention, with this opening device being placed in one of the two sloping gable panels 7 of the upper part. The opening device has a closure part 3, which is shaped like a screw stopper of mainly conventional type.

The opening device and the method of manufacturing the same can also be used with other types of packaging container, e.g. the packaging container 4 shown in FIG. 2, which has a mainly square cross section with rounded corners. The packaging container's bottom surface can be of conventional type and e.g. consist of a number of bottom surfaces folded and sealed to each other in a liquid-tight manner, of the type that is generally used also with gable-top packagings. The upper part of the packaging container 4 contains the opening device 2 according to the invention, and this opening device has a pouring spout which is not visible and which is formed of and constitutes an integrated part of the upper end wall 5 of the packaging container 4. The upper end wall 5 is manufactured of a material which consists wholly of or contains layers of thermoplastic, preferably polythene. The upper end wall 5 is bent down over and sealed to the jacket surface 6 of the packaging container 4, which like the packaging container in general can consist of a packaging laminate of the abovementioned type or naturally be manufactured from some other kind of material. Apart from the upper parts with the opening device 2 the packaging containers do not form any part of the invention but can be of conventional type, and therefore they are not described in greater detail in this connection.

The detailed forming of the packaging containers and especially of the opening devices can be better seen from FIGS. 3 and 4, where the representation of two different preferred embodiments of the opening device according to the invention is described in greater detail.

FIGS. 3 A to 3 E incl. show schematically the various stages in the manufacture of an opening device for a packaging container of the type which is illustrated in FIG. 1, i.e. what is known as a gable-top packaging. The opening device 2 according to the invention is applied on the packaging container before it has been closed, since it is necessary for both the inside and the outside of the packaging material to be accessible during the shaping of the opening device. As can be seen from FIGS. 3 A to 3 E incl. the packaging container is complete, but not yet filled with contents or closed at the top, and therefore the wall panels which form the upper part of it extend vertically upwards and form a continuation of the side walls of the packaging container 1, which gives maximum accessibility so that tools for shaping and applying the opening device according to the invention can be introduced into the upper part of the packaging container.

The packaging container in FIG. 3 A has a mainly conventional shape, but in one of its two opposing top panels 7 a circular part of the packaging container material has been removed and replaced with a disc 8 of thermoplastic material, e.g. polythene. The disc 8 bears against the inside of the packaging material and is given a liquid-tight seal to the thermoplastic inside layer of the packaging material through a heat seal (not visible in the figure) extending in annular form around the opening. In FIG. 3 B it is shown how the thermoplastic material disc 8 is exposed to heating to softening temperature (with polythene c. 110° C.) with the aid of a heating device 9, which includes two legs 10, 11 which carry heater bodies 12, 13 at their outer ends which face each other. The heater bodies 12, 13 are mainly circular and bowl-shaped with a diameter which slightly exceeds the diameter of the disc 8. The heater bodies contain heating elements, e.g. electrical resistance material or channels for hot air (not shown in the figure) for heating the plastic disc in a well known manner over the whole of its area corresponding to the hole in the packaging container wall. As can be seen from FIG. 3 B one leg 10 is brought down through the upper open end of the packaging container, while the other leg 11 is placed parallel to the first named leg but on the outside of the packaging container wall. The legs 10, 11 can be brought towards each other like a pair of tongs so as to place the heater bodies 12, 13 at a suitable distance from the material disc 8 during the heating process.

When the material disc 8 is heated to the desired temperature with the aid of the heating device 9 the next period begins, which is illustrated in FIG. 3 C. In this a forming tool 14 is used, which with two legs 15, 16 like the heating device 9 can be brought down like a pair of tongs into the open end of the packaging container and outside the wall of the packaging container respectively and grip the thermoplastic material 8. One leg 15 contains a mainly circular, bowl-shaped cut-out 17 which is connectable via a channel 18 with a compressed air source (not shown). The opposite leg 16 is provided on its working surface facing the leg 15 with a cut-out 19, which is connectable via a channel 20 with the ambient air. The cut-out 19 is mainly circular and so dimensioned that a closure part 3 (not visible in FIG. 3 C) introduced into the cut-out 19 remains in the cut-out during the use of the forming tool 14. When the forming tool 14 is placed in the position shown in FIG. 3 C the legs 15, 16 are brought together so that they enclose the packaging container wall 7 and the material disc 8 located in it which is heated to softening temperature. As soon as the part of the leg 15 provided with the cut-out 17 is brought to bear sealingly against the inside of the packaging container wall 7 and the leg 16 is brought into contact with the outside of the wall 7 in a corresponding manner the cut-out 17 is connected via the channel 18 with the compressed air source so that an overpressure occurs, which acts on the soft thermoplastic disc 8 so that it is pressed into and shaped according to the inside of the prefabricated closure part 3. The air which is in the closure part 3 streams out via the cut-out 19 and the channel 20 into the ambient air, which makes it possible to bring the thermoplastic disc 8 to accurate, form-locking connection with the threaded or beaded inside of the closure part 3. At the same time as the material in the thermoplastic disc 8 cools down, the legs 15, 16 are moved away from each other and the forming tool 14 is lifted out of engagement with the packaging container. The closure part 3 consequently slides out of the cut-out 19 and remains, thanks to the form-locking engagement with the now shaped material disc 8, on the outside of the packaging container. In FIG. 3 D the packaging container is shown after the forming tool 14 has been removed, and from the figure it can be seen how the central part of the material disc 8 now forms a pouring spout 21 situated inside the closure part 3, with this spout being provided with threads which have been formed in accordance with the threaded internal surface of the closure part 3. From FIG. 3 D it can also be seen how the material in the material disc 8 forms a connected, liquid-tight layer of material from the liquid-tight, annular connection with the inside of the packaging container wall 7 to the outer, closed end of the pouring spout 21, which is arranged only to break in connection with the opening of the packaging container. In FIG. 3 E the finished packaging container is shown, which, after being filled with the contents, is provided, by means of folding and heat sealing, with what is known as a gable-shaped upper part, in which the opening device 2 according to the invention is situated mainly centrally on one top surface. The packaging container is shown in the open state, i.e. the closure part 3, which has the form of a screw stopper, has been unscrewed from the threaded pouring spout 21. Through heat sealing the outer end of the pouring spout 21 to the inside of the closure part 3 an automatic penetration of the outer end of the pouring spout 21 can be effected so that the contents of the packaging container automatically become accessible for pouring out. This will be described in greater detail below. FIGS. 4 A to 4 D incl. show the work phases in the manufacture of an opening device 2 according to the invention with an upper end wall 5 on a packaging container of the type that is shown in FIG. 2. This packaging container's mainly tubular jacket wall 6 is at least externally coated with a thermoplastic material. From FIG. 4 A it can be seen how the jacket wall 6 or at least the upper end of it is placed in an annular holder 22, whose central hole has a shape and size corresponding to the jacket wall. The holder 22 has an upper, flat work surface 23 against which a material disc 24 manufactured from a thermoplastic, e.g. polythene, is placed. The material disc 24 is held fast against the work surface 23 of the holder 22 with the aid of a forming tool 25, whose lower forming surface 26 bears against the top side of the material disc 24. The forming surface 26 is provided with a cut-out 27, in which a prefabricated closure part 3 is placed. The closure part 3 comprises a gable wall 28 and a jacket wall 29 and it can be shaped like a screw stopper with internal threads or a snap-on stopper with internal beading (not shown). The jacket wall of the closure part 3 exhibits a channel in the form of a hole 30, which via suitable channels 31 in the forming tool 25 connects the inside of the closure part 3 with the ambient air. The closure part placed in the forming tool 25 is so turned that its open end is directed downwards and the lower edge of the jacket wall 29 thus bears against the upper surface of the material disc 24. The material disc 24 which has been previously heated to softening temperature is now subjected to a shaping treatment, which is preferably effected through a pressure difference being created between the two sides of the material disc 24. The inside 4 of the packaging container (i.e. the not yet closed bottom end of the packaging container) is suitably connected with a compressed air source which is not shown, at the same time as the forming surface 26 and cut-out 27 of the forming tool 25 are connected via the channels 31 with the ambient air. The pressure difference obtained by this means acts on the material disc 24 from underneath so that it is pressed against the forming surface 26 and the prefabricated closure part 3 which is in the cut-out 27 and which is maintained at room temperature or at any rate at such a temperature that no shaping effect of the material takes place. Since the air which is inside the closure part 3 can freely flow out through the channels 31 in the forming tool 25 it does not offer any resistance to the central part of the material disc 24, but the latter can press in and be shaped according to the inside surface of the closure part so that it engages form-lockingly with threads 32 or beadings, which are not shown, in the closure part 3. Surrounding parts of the material disc 24 are pressed against the forming surface 26, which can be flat or profiled to the desired pattern to give the upper end wall 5 of the packaging container the corresponding shape. As soon as the shaping has been completed the supply of compressed air to the underside of the material disc 24 is cut off and the forming tool 25 removed. At this the closure part 3 remains on the pouring spout 33 formed by the central part of the material disc 24 and provided with threads 32. The holder 22 can now also be removed and an annular part of the material disc 24 extending beyond the jacket wall 6 can be folded down and heat sealed to the outside of the jacket wall. This can if desired also be done at an earlier stage, e.g. in connection with the shaping of the pouring spout. The now shaped pouring spout 23 located in the closure part 3 consists of an integrated part of the connected, liquid-tight layer of material which also forms the upper end wall 5. In order to make possible an upwards breaking of the upper end of the pouring spout 33 in conjunction with the removal of the closure part 3 an annular seal is provided between the upper end surface of the pouring spout 33 and the inside surface of the gable wall 28 of the closure part 3. This is done with the aid of a sealing tool 34, which is mainly circular and has at its upper end an annular work surface which can be heated to sealing temperature. Through pressing the sealing tool 34 against the inner end surface of the pouring spout an annular sealing together of the material in the pouring spout and the closure part occurs, so that the closure part can only be removed from the upper part of the packaging container through simultaneous upwards breaking of the end surface of the pouring spout 33 along the annular sealing line. With the opening of the packaging container according to the invention the screw stopper or closure part 3 is unscrewed, whereupon the end of the pouring spout sealed to the inner surface of the closure part comes away from the pouring spout and follows the screw stopper, which is illustrated in FIG. 4 D. Since the liquid-tight material in the thermoplastic disc 24 is thus broken only in conjunction with the removal of the closure part 3 it is ensured that the opening device remains completely leakproof, at the same time as the construction gives a guarantee against inadvertent or unauthorised opening.

When a packaging container of known type, e.g. the gable-top type shown in FIGS. 1 and 3, is to be provided with an opening device according to the invention the thermoplastic material disc 8 can be applied through heat-sealing on the packaging material already before the latter is shaped into a packaging container, i.e. while it is still in strip or sheet form. The shaping of the packaging material into individual packaging containers can be done after that in the usual manner and with conventional packaging machines right up to the time that the packaging container open at the top is to be filled with the desired contents. Before the filling station one or more stations are inserted for carrying out the procedure according to FIGS. 3 A to 3 D incl., after which the filling can be undertaken in the well known manner and the top part folded together and sealed together in a liquid-tight manner by means of known technology.

The type of packaging container shown in FIGS. 2 and 4 is manufactured through the packaging laminate first being given a tubular shape, after which the longitudinal edges of the material are sealed to each other in a liquid-tight manner so that the jacket wall 6 is formed. After this the jacket wall is placed in the annular holder 22 and the thermoplastic disc 24 is placed to bear against the upper end of the jacket wall 6. The forming tool 25 with the closure part in place in the cut-out 27 is brought into its working position, after which the forming process according to FIGS. 4 A and 4 B takes place. When the forming tool 25 and the holder 22 have been removed and the operation according to FIG. 4 C has eventually taken place the packaging container is turned upside down, after which it is filled via the bottom with the desired contents. Finally the bottom of the packaging container is sealed, e.g. through folding in and heat-sealing of the prepared bottom wall surfaces or in any other suitable manner, e.g. with the aid of a further material disc, which is heat sealed along the lower edge of the jacket wall 6.

Both the opening device and the method of manufacturing the same can of course be used also with completely different types of packaging container, e.g. those which are manufactured from different material combinations and from one or a multitude of different parts. The part of the packaging container which is provided with a pouring spout according to the invention must be manufactured from a heat-formable layer of material, but this can either constitute a limited part of the packaging container or be an integrated part of the total packaging container, which in that case can be entirely manufactured through heat-forming.

When packing containers are produced from a material web, said web can wholly or partly be composed of a thermoformable material. After the reshaping of the material web into packaging containers, which can be both filled with filling goods and sealed, a chosen part of the packing container is heated in order to be shaped, by means of an external vacuum, into a pouring spout in accordance with what is earlier described. If a packaging container is sealed and thus completely air-tight this operation will make use of a part of the head-space area in the packing container and create a certain underpressure so that the flexible walls of the container will bulge slightly inwards. This is however not a drawback. When a packing container of this kind is opened, which can take part in connection with the removal of the closure part or in a later, separate manoeuvre, air will be sucked into the container so that the surface of the filling goods is lowered and the container walls resume their original shape. If the closure part also is manufactured from a thermoplastic material it is conceivable to form this at the same time as the pouring spout, but with this an outer forming part is necessary in order to give the closure part a correct external shape.

The internal shape of the closure device must accord with its external shape (the material must be thin), and the internal shape thereby gives the pouring spout its corresponding shape. A precondition for the above described procedure is of course that the plastic material in the closure part is prevented from sealing to the pouring spout material, at any rate over the greater part of its surface. This can be achieved through suitable selection of material, or through coatings with seal-inhibiting layers.

As previously mentioned, some form of outlet channel 30 is required from inside the closure part 3 in order to prevent air which is in the closure part inhibiting the formation of the pouring spout 21, 33. It is naturally undesirable that the channel should have such a positioning that it causes leakage on reclosure of an opened packaging container with the aid of the closure part 3, and the end of the channel coming out inside the closure part can therefore not be placed in the gable wall 28 of the closure part, which at first sight appears necessary in order to guarantee the escape of the air enclosed during the shaping process. Practical tests have, however, shown that a perfectly satisfactory shaping is ensured even if the end of the channel comes out in the jacket wall 29, since the material in the disc 8, 24 during the shaping process presses the air down from the centre at high speed and to the outside. An optimum compromise between good shaping and minimum leakage has been shown to be obtained if the end of the channel coming out inside the closure part is situated mainly halfway up the jacket wall, i.e. at the same distance from the gable wall 28 and the lower edge of the jacket 29 facing the packaging container.

The channel does not need to be formed as a hole 30 penetrating the jacket wall 29, but can also consist of a slot extending vertically in the jacket's inner wall surface, which via a corresponding slot running radially in the edge surface of the jacket has connection with the ambient air.

I claim:

1. Method of manufacturing an opening device for a packaging container, comprising the steps of:

aligning an open end of a prefabricated part of the opening device with a thermoplastic layer of material; and exposing the thermoplastic material to a pressure difference such that the thermoplastic material is shaped according to an interior area of the prefabricated part of the opening device.

2. Method according to claim 1, comprising the further step of heating the thermoplastic material to it softening temperature before exposing the thermoplastic material to the pressure difference.

3. Method according to claim 2, comprising the further step of maintaining the prefabricated part at a temperature below the softening temperature of the thermoplastic material.

4. Method according to claim 1, comprising the further steps of surrounding the prefabricated part and the thermoplastic material with a forming tool, and developing the pressure difference by evacuating air.

5. Method according to claim 4, wherein the prefabricated part is formed with a outlet channel and air is evacuated from the interior area of the prefabricated part through the outlet channel.

6. Method according to claim 1, comprising the further steps of:

surrounding the prefabricated part of the opening device and the thermoplastic material with a forming tool; and removing the prefabricated part of the opening device from the forming tool and, at the same time, removing the shaped thermoplastic material from the forming tool.

7. Method according to claim 1, comprising the further step of connecting, with means including at least the pressure difference, the thermoplastic material in a liquid-tight manner with adjacent parts of the packaging container.

8. Method according to claim 7, comprising the further step of covering, with the thermoplastic material, an opening in the packaging container, the area of the opening in the packaging container being mainly of the same size as the open end in the prefabricated part.

9. Method according to claim 8, comprising the further step of enclosing edges of the packaging container in a liquid-tight manner with the thermoplastic material.

10. Method according to claim 7, comprising the further step of enclosing edges of the packaging container in a liquid-tight manner with the thermoplastic material.

11. Method according to claim 1, comprising the further step of joining the thermoplastic material in a liquid-tight manner to a packaging container prior to exposing the thermoplastic material to the pressure difference.

12. Method according to claim 11, comprising the further step of covering, with the thermoplastic material, an opening in the packaging container, the area of the opening in the packaging container being mainly of the same size at the open end in the prefabricated part.

13. Method according to claim 11, comprising the further step of enclosing edges of the packaging container in a liquid-tight manner with the thermoplastic material.

14. Method according to claim 1, wherein the prefabricated part is formed with an outlet channel and the pressure difference is developed by evacuating air from the interior area of the prefabricated part through the outlet channel.

15. A method of manufacturing an opening device for a packaging container, comprising the steps of:

aligning a first surface of a disc of thermoplastic material with an open end of a cap having an interior shape defined by substantially cylindrical side walls and a top wall; and applying gas pressure against a second side of the disc so that the disc forms a spout conforming to the interior shape of the cap.

16. The method according to claim 15, comprising the further step of heating the disc to a softening temperature before applying the gas pressure against the second side of the disc.

17. The method according to claim 15, comprising the further steps of aligning edges of the disc with edges around an opening in a wall of a packaging container and forming an annular, liquid-tight seal between the edges of the disc and the edges around the opening.

18. The method according to claim 17, wherein the liquid-tight seal is formed by heat sealing the edges of the disc to the edges around the opening.

19. The method according to claim 18, wherein pressure is applied to the edges of the disc.

20. The method according to claim 19, wherein the pressure is at least partially the gas pressure applied against the second side of the disc.

21. The method according to claim 18, wherein the liquid-tight seal is formed before applying the gas pressure against the second side of the disc.

* * * * *